(12) United States Patent
Song

(10) Patent No.: US 9,834,912 B2
(45) Date of Patent: Dec. 5, 2017

(54) METHOD FOR MANUFACTURING MAIN BODY OF WATER-SAVING DEVICE AND MAIN BODY OF WATER-SAVING DEVICE

(76) Inventor: Byung Gyou Song, Seoul (KR)

( * ) Notice: Subject to any disclaimer, the term of this patent is extended or adjusted under 35 U.S.C. 154(b) by 297 days.

(21) Appl. No.: 13/876,532

(22) PCT Filed: Nov. 2, 2011

(86) PCT No.: PCT/KR2011/008276
§ 371 (c)(1),
(2), (4) Date: Mar. 28, 2013

(87) PCT Pub. No.: WO2012/124875
PCT Pub. Date: Sep. 20, 2012

(65) Prior Publication Data
US 2013/0174929 A1 Jul. 11, 2013

(30) Foreign Application Priority Data
Mar. 14, 2011 (KR) .................. 10-2011-0022183

(51) Int. Cl.
*E03C 1/04* (2006.01)
*F16K 27/04* (2006.01)

(52) U.S. Cl.
CPC ............ *E03C 1/0404* (2013.01); *E03C 1/04* (2013.01); *F16K 27/045* (2013.01); *Y10T 137/9464* (2015.04)

(58) Field of Classification Search
CPC ..................... E03C 1/0404; F16K 19/006

USPC .............. 137/315.12, 602, 801; 4/675–678
See application file for complete search history.

(56) References Cited

U.S. PATENT DOCUMENTS

| | | | | |
|---|---|---|---|---|
| 5,131,428 | A * | 7/1992 | Bory | 137/606 |
| 6,802,334 | B2 * | 10/2004 | Ericsson | 137/270 |
| 2004/0117906 | A1 * | 6/2004 | Baker et al. | 4/676 |
| 2010/0282349 | A1 * | 11/2010 | Esche | E03C 1/04 137/801 |
| 2012/0186679 | A1 * | 7/2012 | Tarng | B29C 45/16 137/801 |

FOREIGN PATENT DOCUMENTS

| | | |
|---|---|---|
| JP | 08-260526 A | 10/1996 |
| KR | 20-0383401 Y1 | 5/2005 |
| KR | 10-0745084 B1 | 8/2007 |
| KR | 10-0799070 B1 | 1/2008 |
| KR | 10-0857250 B1 | 9/2008 |

* cited by examiner

*Primary Examiner* — Kevin Murphy
*Assistant Examiner* — Kelsey Cary
(74) *Attorney, Agent, or Firm* — Novick, Kim & Lee, PLLC; Jae Youn Kim

(57) ABSTRACT

A method for manufacturing a water faucet having a main body is provided. Several housing parts of the main body are made of brass using the method of injection molding, and then the inner parts of the main body corresponding the housing parts are made of a polyamide resin using the method of double injection molding together with the respective housing parts.

3 Claims, 12 Drawing Sheets

METHOD FOR MANUFACTURING MAIN BODY OF WATER-SAVING DEVICE AND MAIN BODY OF WATER-SAVING DEVICE

TECHNICAL FIELD

The present invention relates, in general, to a main body of a faucet and a method for manufacturing the same and, more particularly, to a main body of a faucet which is made of brass and has a structure different from conventional ones and a method for manufacturing the same which forms a double-layered molding assembly, which is non-hazardous to human beings, has high heat resistance, and is not prone to corrosion, as the main body of a faucet, thereby preventing unsanitary conditions from being created inside the faucet, protecting users from getting burns due to high thermal conductivity of the faucet, achieving long durability, and reducing manufacturing cost while responding to demand for diverse designs of faucets.

BACKGROUND ART

Generally, a faucet is installed near a bathroom sink or a kitchen sink and is connected to a boiler to allow a user to selectively use cold or hot water.

The main body of the faucet is generally used in combination with a plurality of auxiliary components such as a valve, an operation lever, a packing rubber, and connection hoses. Among them, the main body of the faucet is generally made of brass because brass is easily shaped in a molding process.

However, in most cases, the work environment a in which the main body of a faucet is manufactured using a molding process is polluted. Furthermore, the molding process involves hazardous substances (graphite, impurities, or the like). Therefore, the pollutants in the environment of the workplace and/or the hazardous substances used in the molding process remain in the main body of the faucet. This body is installed as it is in the faucet. In this case, drinking water from the faucet is hazardous to a person's body. Aside from this, since the working environment in which the molding process is performed is unsanitary and/or dangerous, workers are reluctant to work there.

In addition, when the body of the faucet is installed in the faucet and used, the inside surface of the body gets corroded by water after a long period of use, causing unsanitary conditions inside the faucet. This pollutes drinking water and endangers the health of people drinking water from the faucet.

Furthermore, the body of the faucet is made of brass and thus has high thermal conductivity. For this reason, when using hot water, users, especially elderly people and children, can be easily burned, even from having brief skin contact with the faucet.

Further still, since the body of the faucet is manufactured in the form of one integrated body, different molds are used to produce faucets of different designs. This increases the production cost of faucets.

DISCLOSURE

Technical Problem

Accordingly, the present invention has been made keeping in mind the above problems occurring in the related art, and is intended to provide a main body of a faucet which is made of brass and has a structure different from a conventional faucet and a method for manufacturing the same which forms a double-layered molding assembly, which is non-hazardous to human beings, has high heat resistance, and is not prone to corrosion, thereby preventing unsanitary conditions from being created, protecting users from getting burns due to high thermal conductivity, achieving long durability, and reducing manufacturing cost while responding to demand for diverse designs of faucets.

Technical Solution

In order to achieve the object, according to one aspect, the present invention provides a method for manufacturing a main body of a faucet which has a hot water inlet and a cold water inlet at both sides, respectively, and a cold/hot water discharge port, in which hot water and cold water are mixed, and is equipped with a valve for stopping a flow of water at an upper portion and a lever for adjusting the valve, the method including: preparing separately a base body in which the valve is installed, a first assembly in which the hot water inlet is formed, a second assembly in which the cold water inlet is formed, and a third assembly in which the water discharge port is formed by a brass molding process; performing a double injection molding process to form internal molding assemblies of a polyamide-based resin composition inside the base body and the first to third assemblies, respectively, the internal molding assemblies having fluid passages, respectively and connection portions, respectively; combining the base body with the first to third assemblies to form a single body; and plating nickel-chrome onto an external surface of the resultant single body to reinforce bonding force at combined portions or to conceal seams at the combined portions.

Another aspect provides a main body of a faucet provided with a hot water inlet and a cold water inlet at both sides, respectively, a water discharge portion in which hot water and cold water are mixed, a valve, at an upper portion, for stopping a flow of water, and a lever for adjusting the valve, the main body including: a base body in which the valve is installed; a first assembly in which the hot water inlet is formed; a second assembly in which the cold water inlet is formed; a third assembly in which the water discharge port is formed by separate brass molding processes, in which the base body, the first assembly, the second assembly, and the third assembly are structured to be able to be assembled to form one body; and internal molding assemblies of a polyamide-based resin composition which are formed inside the base body and the first to third assemblies, respectively by a double injection process, the internal molding assemblies having fluid passages, respectively and connection portions, respectively.

A further aspect provides a main body of a faucet provided with a hot water inlet and a cold water inlet at both sides, respectively, a water discharge pipe portion at an upper portion, a valve, at an upper portion, for stopping a flow of water, and a valve assembly for fixing the valve, the body including: a base body which is made of brass and combined with the valve at one side; a first assembly in which the hot water inlet is formed; a second assembly in which the cold water inlet is formed, in which the base body, the first assembly, and the second assembly are structured to be able to be assembled to form one body; and internal molding assemblies of a polyamide-based resin composition which are formed inside the base body and the first and second assemblies, respectively by a double injection process, the internal molding assemblies having fluid passages, respectively and connection portions, respectively.

A yet further aspect provides a main body of a faucet provided with a hot water discharge portion at one side portion, and a valve for stopping a flow of water and a valve assembly for fixing the valve at an upper portion, the body including: a base body which is made of brass and has a barrel shape in which the valve is installed; a fourth assembly in which the water discharge portion is formed; and internal molding assemblies of a polyamide-based resin composition which are formed inside the base body and the fourth assembly, respectively, by a double injection process, the internal molding assemblies each having a fluid passage and a connection portion.

Advantageous Effects

As described above, in the main body of a faucet and the method for manufacturing the same according to the present invention, a polyamide-base body resin composition being non-hazardous to human beings and having high heat resistance and heat high thermal barrier effect is double-injected inside a brass body, and then all components required to form a faucet are assembled. In this way, the main body of a faucet and the method for manufacturing the same according to the present invention present facilitates workability in a manufacturing process, and offers advantageous effects such as anti-corrosion, safety of running water, anti-burning, and prevention of freezing and bursting of pipes.

BEST MODE

Figure 1:
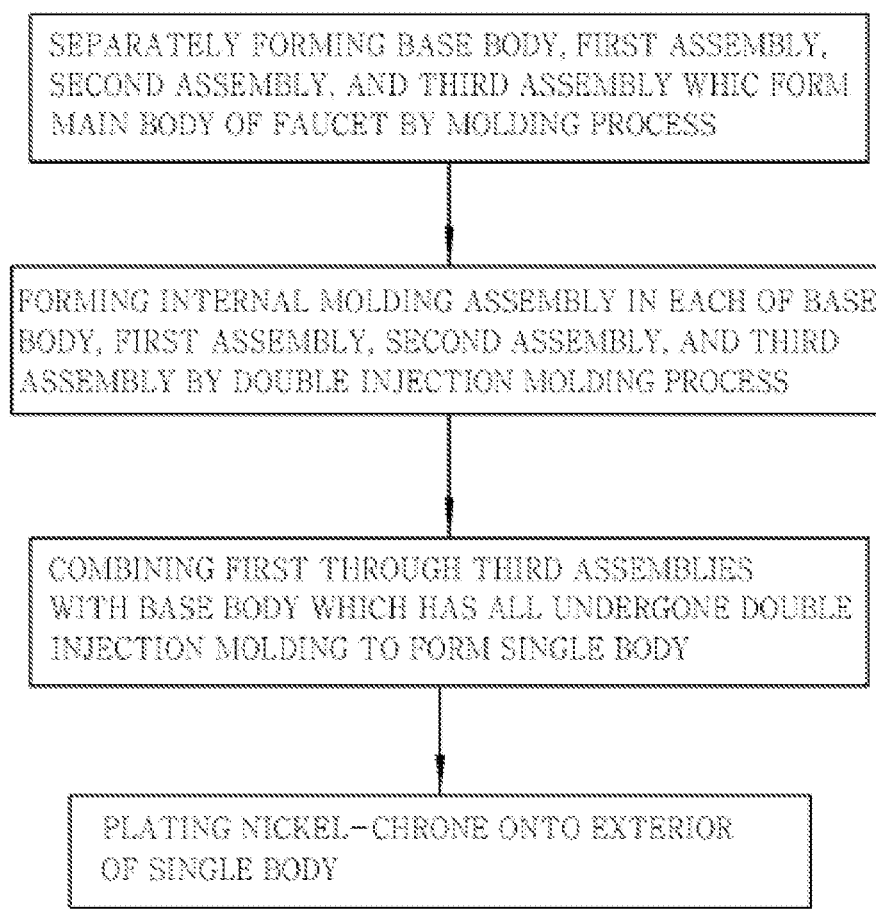
FIG. 1 is a process flowchart sequentially illustrating manufacturing processes of a main body of a faucet according to the present invention.

Hereinbelow, preferred embodiments of the present invention will be described in detail with reference to the accompanying drawings, FIGS. 1 through 12.

According to the present invention, a main body 10 of a faucet has a hot water inlet 12a and a cold water inlet 14a at both side portions, respectively and a water discharge port 16a in which hot water and cold water are mixed, and is provided with a valve V for stopping a flow of water, a lever L for adjusting the valve, and a valve assembly V1 for fixing the valve at an upper portion.

The main body 10 of a faucet is made of brass and is made up of a base body 11 in which the valve V is installed, a first assembly 12 in which the hot water inlet 12a is formed, a second assembly 14 in which the cold water inlet 14a is formed, and a third assembly 16 in which the water discharge port is formed. The base body 11, the first assembly 12, the second assembly 14, and the third assembly 16 are structured such that they can be assembled to form the main body 10 of a faucet. Internal molding assemblies 22, 24 and 26 having fluid channels 22a, 24a and 26a, and connection portions 22b, 24b and 26b, respectively, are formed through separate double injection molding processes, and are made of polyamide-base body resin. The internal molding assemblies 22, 24 and 26 are formed inside the base body 11 and the first through third assemblies 12, 14 and 16, respectively.

Figure 8:
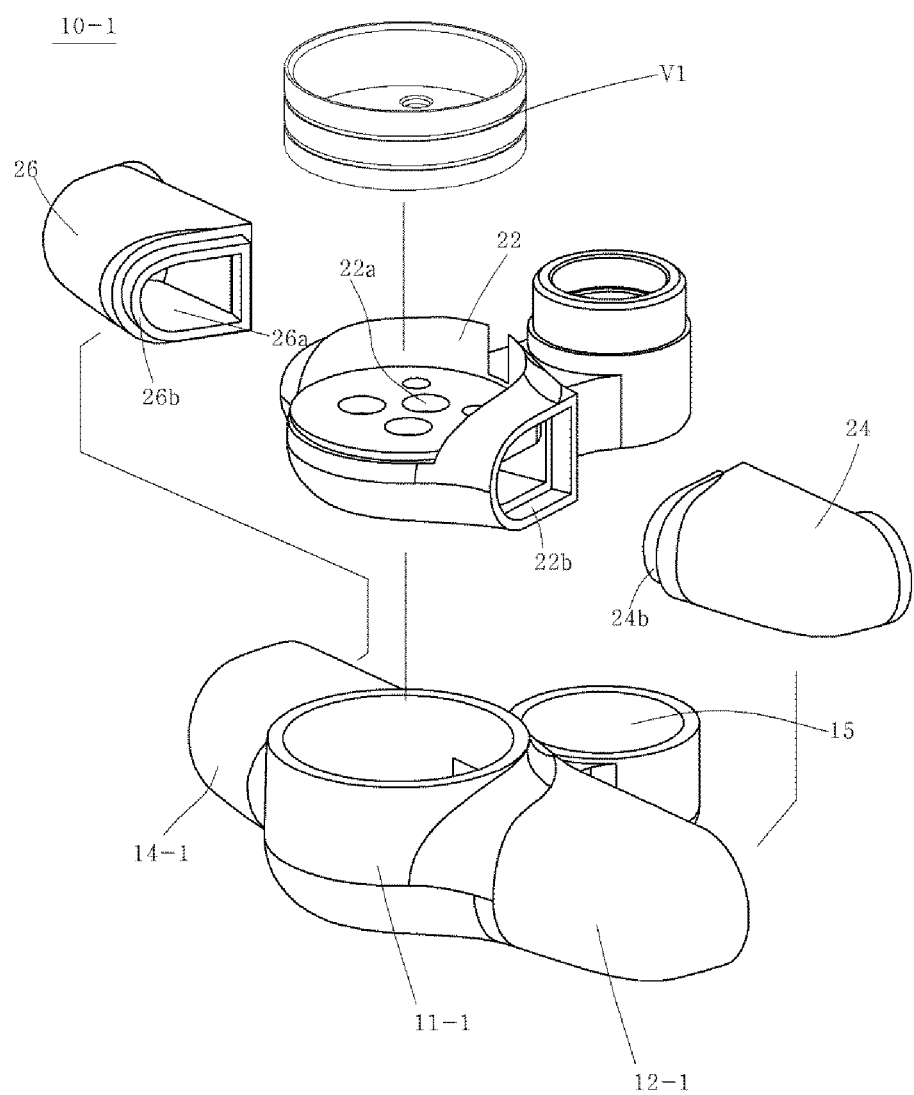
FIG. 8 is an exploded perspective view illustrating a main body of a faucet according to an embodiment of the present invention.
Figure 9:
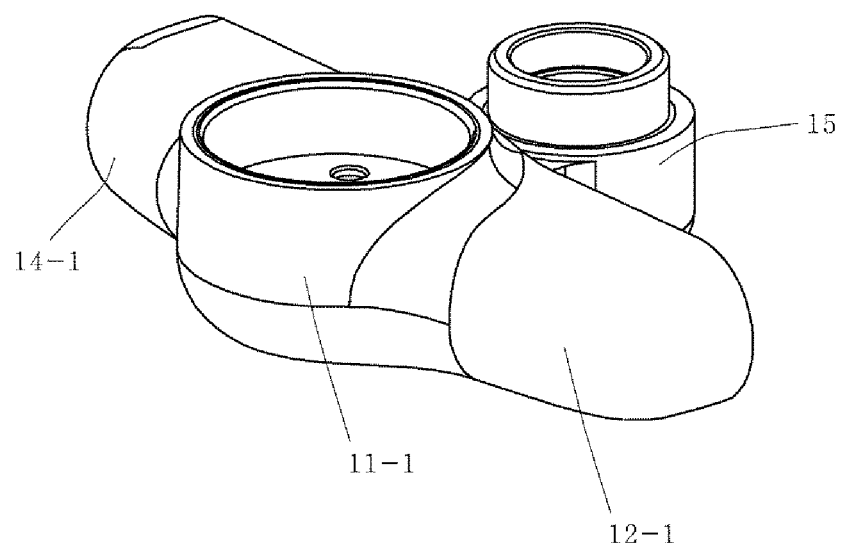
FIG. 9 is a perspective view illustrating the main body of a faucet assembled with the components illustrated in FIG. 8.
Figure 10:
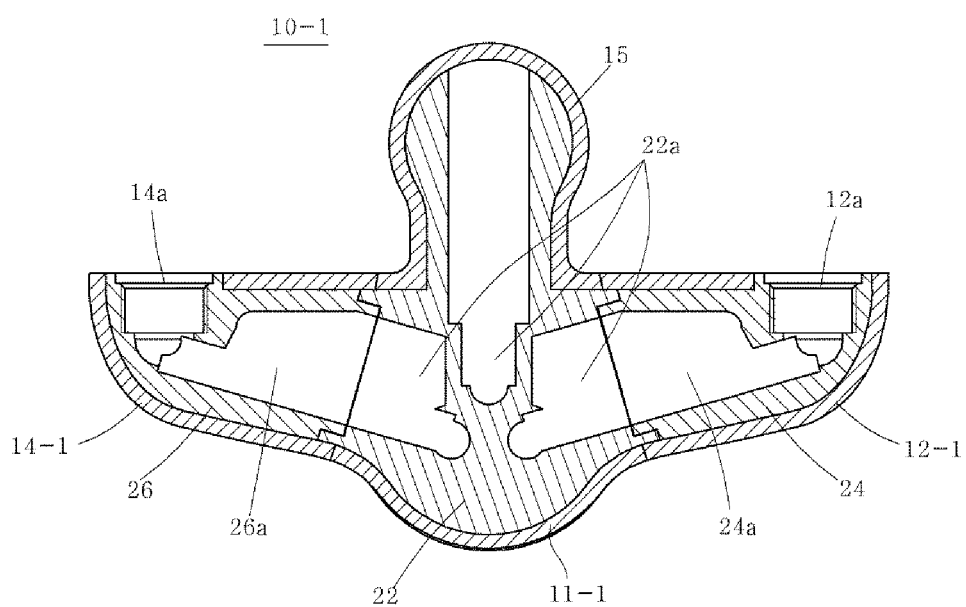
FIG. 10 is a lateral cross-sectional view illustrating the main body of a faucet assembled with the components illustrated in FIG. 8.

A main body of a faucet according to another embodiment of the present invention will be described with reference to FIGS. 8 to 10. A main body 10-1 of a faucet has a hot water inlet 12a and a cold water inlet 14a provided at both side portions, respectively, and a water discharge portion 15 at an upper portion, and is connected to a valve for stopping a flow of water at an upper portion and to a valve assembly V1 for fixing the valve.

The body 10-1 includes a base body 11-1, which is made of brass and integrally formed with a water discharge pipe portion 15 and in which the valve V is installed, a first assembly 12-1 in which a hot water inlet 12a is formed, and a second assembly 14-1 in which a cold water inlet 14 is formed. The base body 11-1, the first assembly 12-1, and the second assembly 14-1 are structured such that they can be assembled form the main body 10-1 of a faucet. Internal molding assemblies 22, 24 and 26, which are made of polyamide-based resin and have fluid channels 22a, 24a and 26a, respectively, and connection portions 22b, 24b and 26b, respectively, are formed through double injection molding processes. The internal molding assemblies 22, 24 and 26 are formed inside the base body 11, the first assembly 12-1, and the third assembly 14-1, respectively.

Figure 11:
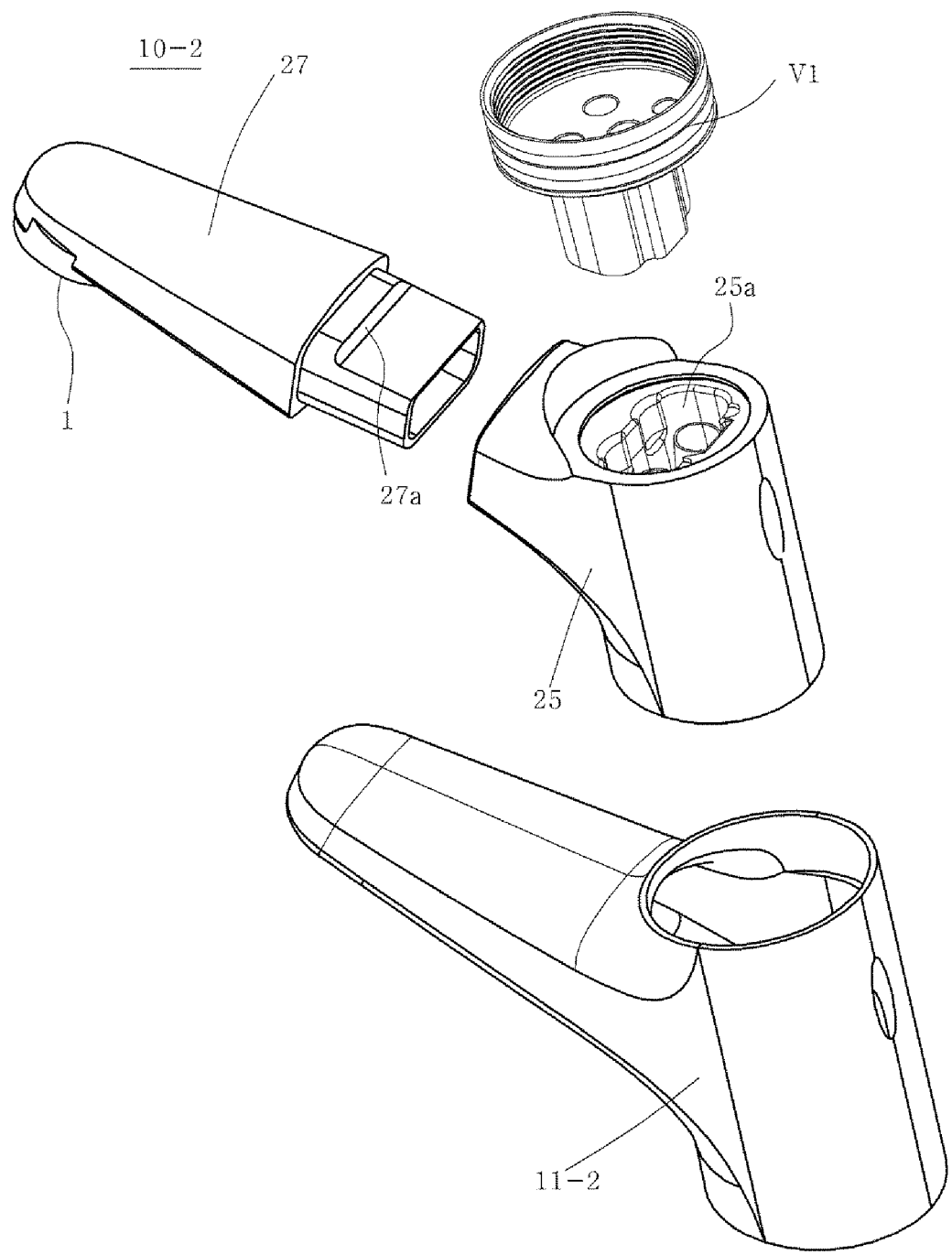
FIG. 11 is an exploded perspective view illustrating a main body of a faucet according to another embodiment of the present invention.
Figure 12:
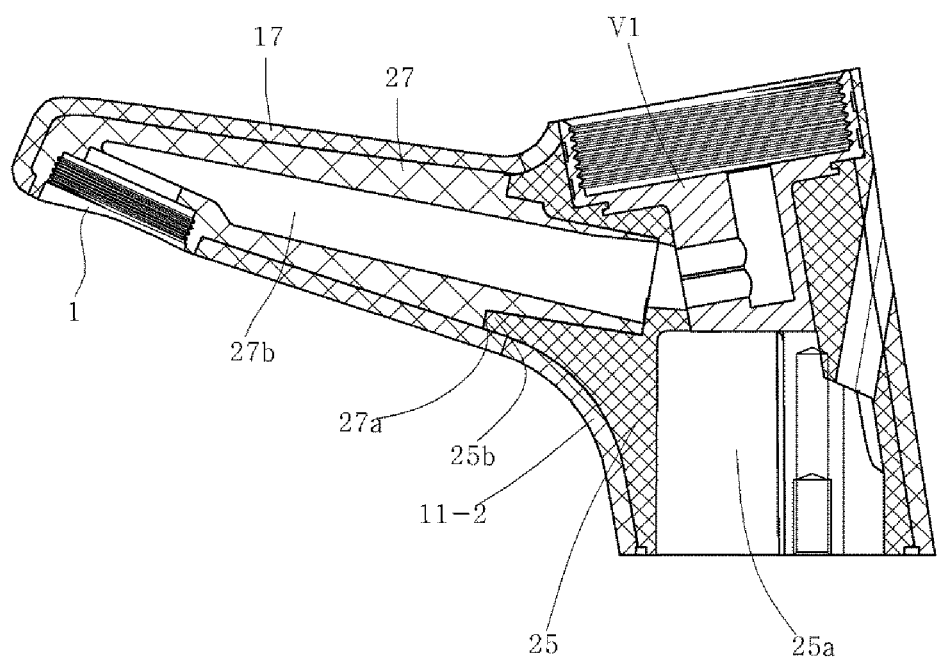
FIG. 12 is a vertical cross-sectional view illustrating the main body of a faucet assembled with components illustrated in FIG. 11.

A main body of a faucet according to a further embodiment of the present invention will be described with reference to FIGS. 11 and 12.

A main body 10-2 of a faucet has a water discharge port 1 in a portion and is equipped with a valve V for stopping a flow of water and a valve assembly V1 for fixing the valve V at an upper portion.

The main body 10-2 of a faucet includes a base body 11-1, which is made of brass and has a barrel shape in which the valve is installed, and a fourth assembly 17 in which the water discharge port is formed. In the base body 11-2 and the fourth assembly 17, internal molding assemblies 25 and 27, which are made of a polyamide-based resin composition and have fluid channels 25a and 27a, respectively, and connection portions 25b and 27b, respectively are formed. The internal molding assemblies 22, 24 and 26 are formed through double injection molding processes.

A method of manufacturing the main body 10 of a faucet according to the present invention will be described with reference to FIGS. 1 through 6 of the accompanying drawings.

Each component is separately molded using brass. For example, the base body in which the valve V is installed, the first assembly 12 in which the hot water inlet 12a is formed, the second assembly 14 in which the cold water inlet 14a is formed, and the third assembly 16 in which the water discharge port 16a is formed are separately molded first.

Figure 2:
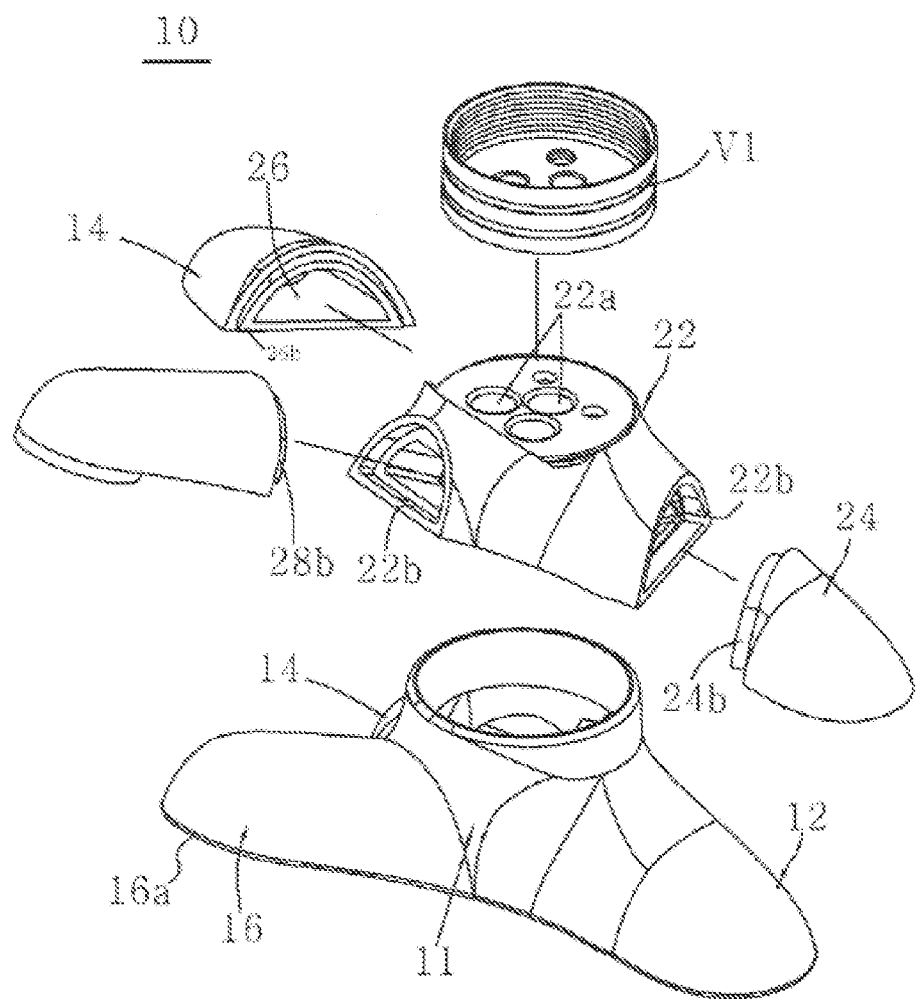
FIG. 2 is an exploded perspective view illustrating each part of the main body of a faucet according to the present invention.

The internal molding assemblies 22, 24, 26 and 28 are formed inside the base body 11 and the first through third assemblies 12, 14 and 16, respectively, through a double injection molding process. The internal molding assemblies 22, 24, 26 and 28 made of a polyamide-based resin composition have fluid channels 22a, 24a, 26a and 26a, respectively, and connection portions 22b, 24b, 26b and 28b, respectively. The connection portions 22b, 24b, 26b and 28b can include a protrusion 24b disposed at an end of the first internal molding assembly 24 and extended from an internal surface thereof, and also a recess 22b disposed at an inside surface of the base internal molding assembly 22 to engage with the protrusion 24b as shown in FIG. 2.

At this point, the internal molding assemblies 22, 24, 26 and 28 obtained through the double injection molding process are formed to be in tight contact with the base body 11 and the first through assemblies 12, 14 and 16 when molded, and the connection portions 22b, 24b, 26b and 28b, and the base body 11 and the first to third assemblies 12, 14 and 16 are put together and combined like a puzzle.

Figure 3:
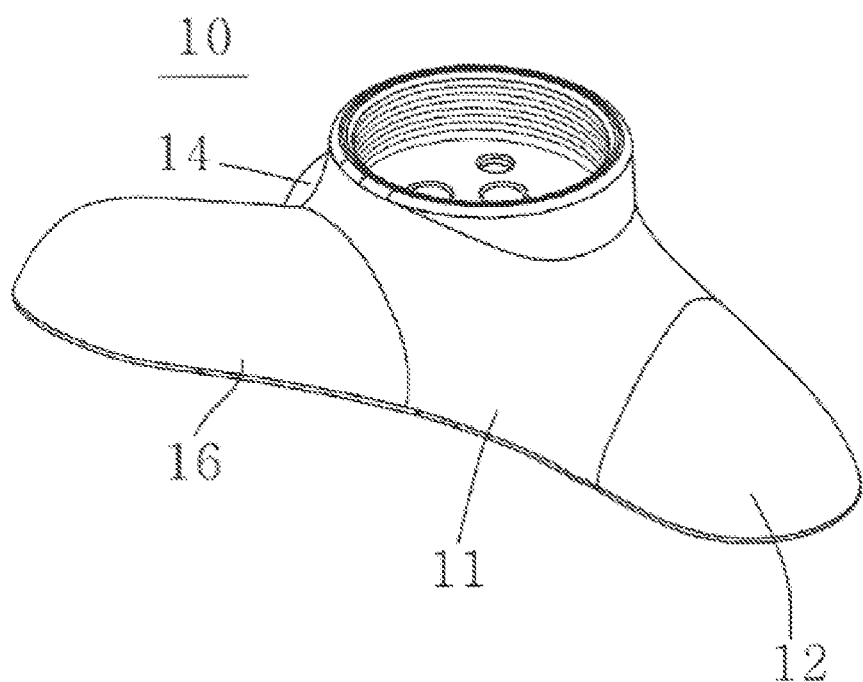
FIG. 3 is a perspective view of the main body of a faucet which is assembled with the components illustrated in FIG. 2.
Figure 4:
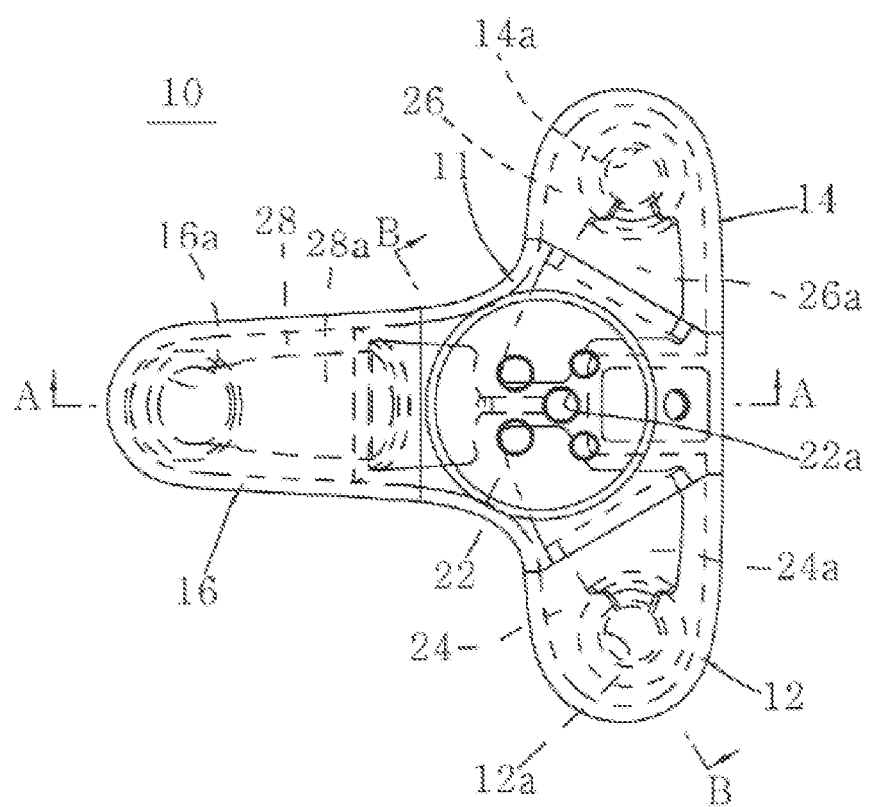
FIG. 4 is a plan view illustrating the main body of a faucet according to the present invention.
Figure 5:
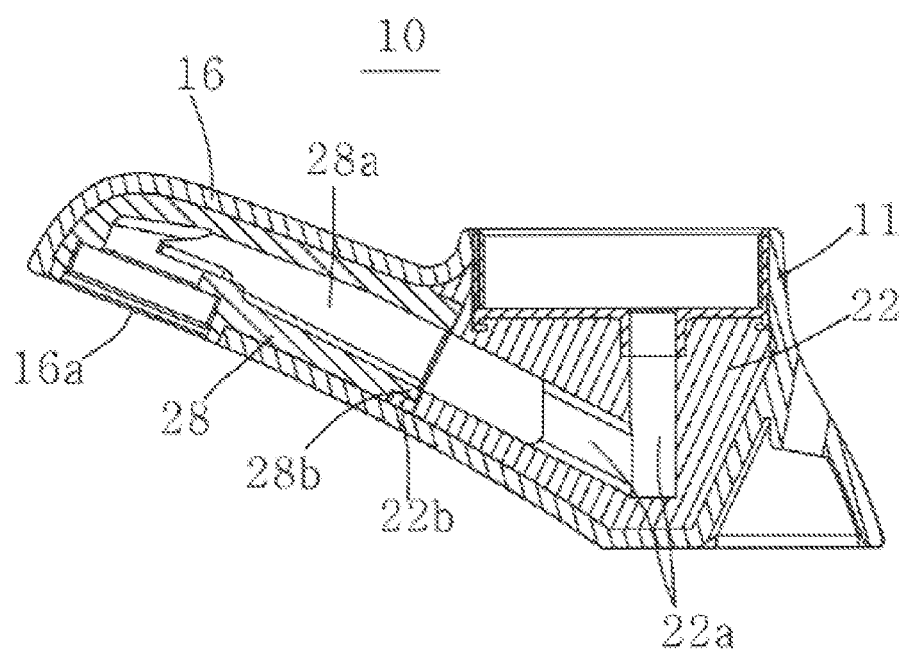
FIG. 5 is a vertical cross-sectional view taken along a line A-A in FIG. 4, in order to illustrate the inside structure of the main body of a faucet.
Figure 6:
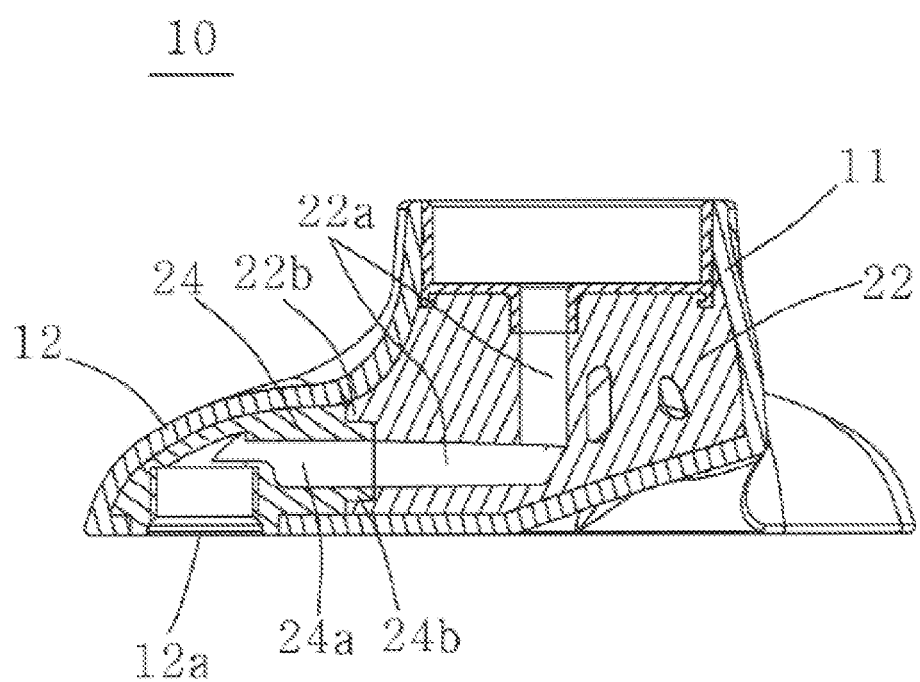
FIG. 6 is a vertical cross-sectional view taken along a line B-B in FIG. 4, in order to illustrate the inside structure of the main body of a faucet.
Figure 7:
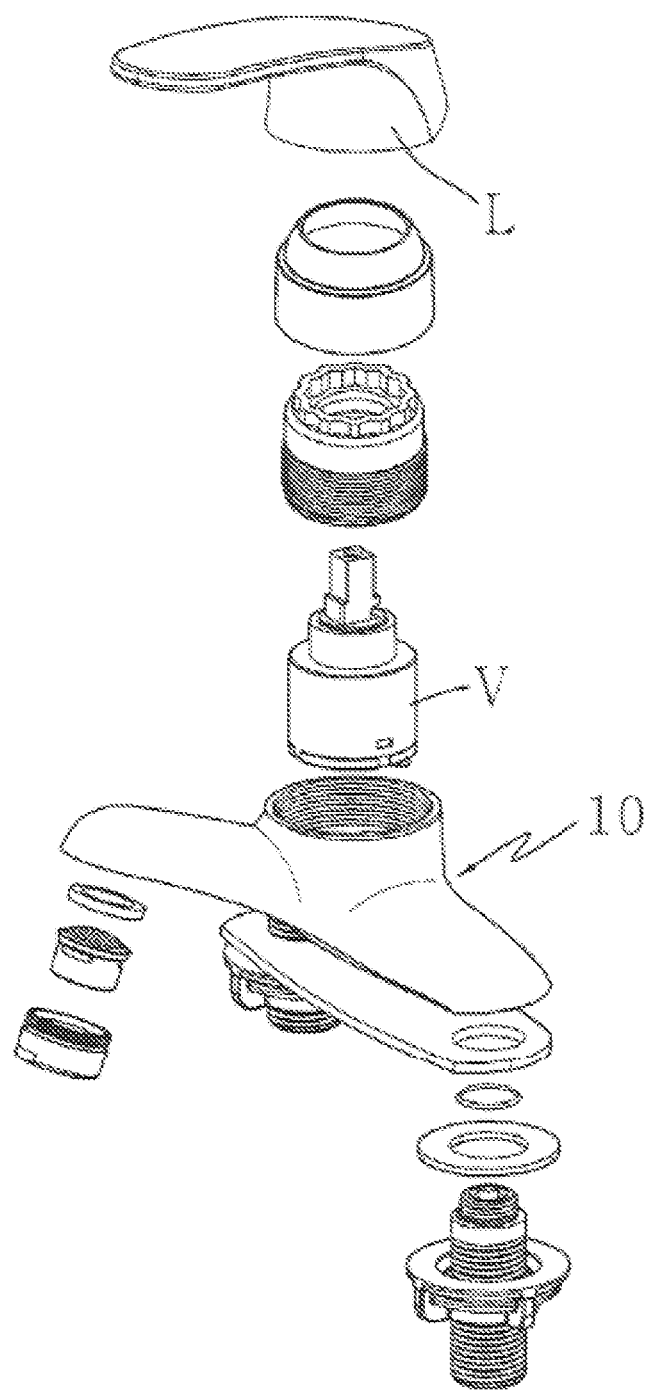
FIG. 7 is an exploded perspective view illustrating the main body of a faucet according to the present invention and auxiliary components.

Each of the molded components are put together such that the first to third assemblies 12, 14 and 16 are assembled and combined with the base body 11 via the connection portions 22b, 24b, 26b and 28b so as to form a single body, the main body 10 of a faucet 10, as illustrated in FIG. 3. The boundaries, that is, the combined portions of each component, are shown in the drawings.

In order to reinforce the bonding force at the boundaries or to conceal the boundaries, the entire surface of the main body of a faucet is generally plated with nickel-chrome (not illustrated in the drawings) by electrolysis plating so that a faucet main body with a smooth surface can be produced and manufacturing of the faucet main body can be completed. The main body of a faucet which is manufactured in this way is combined with other auxiliary components such as a lever L, a valve V, and the like so that the faucet is ready for installation.

The bodies of faucets 10-1 and 10-2 illustrated in FIGS. 8 to 12 of the accompanying drawings are also assembled in the same manner as described above. The only thing that is different about the bodies 10-1 and 10-2 of faucets is the design.

In terms of the configuration of each of the bodies 10, 10-1 and 10-2 of faucets in which the internal molding assemblies 22, 24, 25, 26, 27 and 28 are provided inside the basic bodies 11, 11-1 and 11-2, since the internal molded bodies 22, 24, 26 and 28 are made of a polyamide-based resin composition such as nylon resin, the bodies of faucets have improved durability.

Water which flows out of the water discharge port 16a via the fluid channel 22a, 24a, 25a, 25a, 27a and/or 28a or water which flows out of a connection hose (not illustrated) applied to or installed in the water discharge pipe portion 15 is non-hazardous to a person's body and can be safely consumed, because the internal molding assemblies prevent corrosion of brass, which is a material used to make the body 10, and prevent hazardous materials which adhere to the surface of the brass-based body during the molding process from being dislodged by the water, thereby contaminating the water.

As is generally known, since the polyamide-based resin compositions have high heat resistance, the internal molding assemblies intercept heat transferred from hot water to the brass portion of the body while the hot water is flowing through the main body of a faucet, thereby preventing a user from being burned by the heat from the hot water.

Furthermore, in a case where the main body of a faucet is installed outdoors, the internal molding assemblies function to prevent freezing and bursting in the winter season.

Further still, since the main body of a faucet according to the present invention is manufactured by combining several auxiliary components and the base body together, it is possible to respond to demand for diverse designs of faucets by assembling different auxiliary components with the base body. This leads to a reduction in cost of mold design and mold fabrication processes required to produce diverse designs of faucets.

MODE FOR INVENTION 10, 10-1, 10-2: main body of a faucet
11, 11-1, 11-2: base body
12, 12-1: first assembly
14, 14-1: second assembly
15: water discharge pipe portion
16: third assembly
22, 24, 25, 26, 27, 28: internal molding assemblies
22a, 24a, 25a, 26a, 27a, 28a: fluid channel
22b, 24b, 25b, 26b, 27b, 28b: connection portion

The invention claimed is:
1. A method for manufacturing a main body of a faucet provided with a hot water inlet and a cold water inlet disposed at both sides of the main body, respectively, a water discharge portion in which hot water and cold water are mixed, a valve disposed at an upper portion of the main body for stopping a flow of water, and a lever for adjusting the valve, the method comprising:
  preparing a base body in which the valve is installed, a first assembly in which the hot water inlet is formed, a second assembly in which the cold water inlet is formed, and a third assembly in which the water discharge port is formed by separate brass injection molding processes;
  performing a subsequent double injection molding process inside the base body and the first to third assemblies, respectively, to form a base, a first, a second and a third internal molding assemblies of a polyamide-based resin composition, the base, first, second and third internal molding assemblies having fluid passages, respectively, and connection portions, respectively, such that the base, first, second and third internal molding assemblies are in contact with the base body and the first to third assemblies respectively;
  combining the base body with the first to third assemblies together to form the main body of the faucet; and
  plating an external surface of the resultant body with nickel-chrome to reinforce bonding force at combined portions of the body or to conceal the combined portions.
2. A main body of a faucet provided with a hot water inlet and a cold water inlet disposed at both sides of the main body, respectively, a water discharge portion in which hot water and cold water are mixed, a valve disposed at an upper portion of the main body for stopping a flow of water, and a lever for adjusting the valve, the main body comprising:
- a base body in which the valve is installed;
- a first assembly in which the hot water inlet is formed;
- a second assembly in which the cold water inlet is formed;
- a third assembly in which the water discharge port is formed, wherein the base body, the first assembly, the second assembly and the third assembly are formed by separate brass injection molding processes respectively, the base body, the first assembly, the second assembly, and the third assembly being structured to be able to be assembled to form one body; and
- a base, a first, a second and a third internal molding assemblies of a polyamide-based resin composition, which are formed inside the base body and the first to third assemblies, respectively, by a subsequent double injection molding process, the internal molding assemblies having fluid passages, respectively and connection portions, respectively,
- wherein the four internal molding assemblies are in contact with the base body and the first to third assemblies respectively, and
- wherein the first internal molding assembly includes a protrusion disposed at an end thereof and extended from an internal surface thereof, and the base internal molding assembly includes a recess disposed at an inside surface thereof and configured to engage with the protrusion of the first internal molding.

3. A main body of a faucet provided with a hot water inlet and a cold water inlet disposed at both sides of the main body, respectively, a water discharge pipe portion connected to a valve disposed at an upper portion of the main body for stopping a flow of water, and a valve assembly for fixing the valve, the main body comprising:
- a base body which is made of brass and combined with the valve;
- a first assembly in which the hot water inlet is formed;
- a second assembly in which the cold water inlet is formed, wherein the base body, the first assembly and the second assembly are formed by separate brass injection molding processes respectively, the base body, the first assembly, and the second assembly being structured to be able to be assembled to form one body; and
- a base, a first and a second internal molding assemblies of a polyamide-based resin composition which are formed inside the base body and the first and second assemblies, respectively, by a subsequent double injection molding process, the three internal molding assemblies having fluid passages, respectively, and connection portions, respectively,
- wherein the three internal molding assemblies are in contact with the base body, and the first and second assemblies respectively, and
- wherein the first internal molding assembly includes a protrusion disposed at an end thereof and extended from an internal surface thereof, and the base internal molding assembly includes a recess disposed at an inside surface thereof and configured to engage with the protrusion of the first internal molding.

* * * * *